United States Patent [19]
Knauth

[11] 3,783,688
[45] Jan. 8, 1974

[54] FLOW METERING DEVICE

[75] Inventor: Berthold A. Knauth, Daytona Beach, Fla.

[73] Assignee: Rotron Incorporated, Woodstock, N.Y.

[22] Filed: Aug. 14, 1972

[21] Appl. No.: 280,333

[52] U.S. Cl. ................................ 73/194 R, 73/229
[51] Int. Cl. ............................................. G01f 1/06
[58] Field of Search ................. 73/229, 230, 231 R, 73/231 M, 194 E, 194 R

[56] References Cited
UNITED STATES PATENTS
3,583,220  6/1971  Kawakami ...................... 73/229 X
3,465,586  9/1969  Johnston .......................... 73/229 X

*Primary Examiner*—Jerry W. Myracle
*Attorney*—Roger L. Martin

[57] ABSTRACT

A metering device for measuring volume flow rate or density conditions has a linearly moveable fluid reactive screw member. At one position of movement, the assembly is positively driven so that the screw carries to another position at which the drive means is rendered inoperative. As such, the screw assembly seeks a null position at which forces operating on the assembly are balanced, the sensed revolutions of the assembly being equatable to the volume flow or density condition depending upon the mode of operation of the device. Buoyancy and gravitational force components acting along the line of movement are equalized when the device is used in the fluid flow mode of operation while a force biasing the screw assembly into the drive position is needed when density conditions are being sensed. Gravitational and magnetic biasing is illustrated although other means may be used. One embodiment uses a pivotal mounting arrangement for the screw assembly and the drive motor is energized and de-energized in response to the sensed position of the pivot arm. In another embodiment, a clutching arrangement is used and wherein one clutch plate is driven and the other clutch plate is fixed to the screw assembly. The screw under such circumstances seeks a null position at which clutch plate slippage occurs and the forces acting on the line of movement of the assembly are equalized.

15 Claims, 9 Drawing Figures

FLOW METERING DEVICE

BACKGROUND OF THE INVENTION

The invention relates to fluid metering devices and more particularly to devices for measuring volume flow rate and fluid density conditions.

Most fluid flowmeters for measuring the volume flow rate conditions are of the so-called "turbine" type that have a screw member which is rotatably driven by the flowing fluid. The revolutions per unit time of the screw member are linearly related over appreciable ranges to the volume flow during the time period. However, viscosity and temperature changes of the fluids adversely affect the linear relationship. Additionally, fluid friction with the rotating screw member and mechanical friction in the support systems for such screw members also limit the ranges of acceptable linearity even under ideal conditions where viscosity and temperature conditions are unchanging.

In the densitometer art fluid temperature and vicosity changes are known to adversely affect the accuracy of such meters and attempts to compensate for such changes have led to complicated structures in the density measuring devices and in some cases have required separate measurements of such changing conditions so as to provide separate signals for use in correcting the metered density condition.

SUMMARY OF THE INVENTION

In accord with the invention and rather than letting the flowing fluid perform the drive function for the screw member used in sensing the flow rate condition, the inventor provides a means for positively rotatably driving the screw member in an upstream direction and at an average upstream velocity which is equal to that of the average downstream velocity of the flowing fluid. It can be shown that the energy required to drive the screw under such circumstances is equal to that required to compensate for friction and fluid property changes so that regardless of the changes in these factors, the relationship between the rpm of the rotating assembly and the volume flow per unit time remains linear. As a consequence of the discovery, substantially expanded ranges of linearity are attainable by comparison to the more conventional turbine meters where the screw member is driven by the flowing fluid.

In one instrument embodying the invention the drive motor and screw element are drivingly connected and suspended in the fluid stream at the end of a pivot arm arranged to pivot in the downstream direction under the influence of the flowing fluid. Within the limits of pivotal movement permitted, the movement of the screw element is substantially linear and in the embodiment a control switch in the motor energizing circuit is arranged to close the circuit at a predetermined position for the assembly at which the flow of fluid is detected. This causes the screw to rotate and advance the assembly in an upstream direction and whereupon the switch opens so that the driven circuit is deenergized when the assembly is upstream from the predetermined position. The net result is that the assembly is constantly seeking a null position at which the forces tending to move the assembly upstream under the influence of the motor and those tending to move the assembly downstream for reasons of the flowing fluid are equal. A sensor is used in the embodiment for sensing the rotational movement of the rotating assembly and which has an output signal equatable to a revolution of the assembly so that the number of revolutions can be totalized in the counter or otherwise used to establish the volume fluid rate condition. The motor used in the embodiment is a constant speed motor. However, in its broader sense the invention contemplates that a variable speed motor may be used in a circuit to drive the screw assembly. Under such circumstances, a resistor or other component variable in response to the position of the pivot arm may be used as a means for controlling the motor speed in accord with the fluid flow condition, as will be apparent to one skilled in the art.

In another embodiment of the invention, the screw assembly is mounted for limited axial movement in up and downstream directions and is coupled to the drive for the screw through a clutch having a clutch plate that is fixed in its location and constantly driven. The fixed clutch plate basically determines the downstream limit of movement of the rotating screw assembly and the other clutch plate under such circumstances is axially moveable with the screw assembly. The flow of fluid acting on the fluid reaction urges the screw assembly downstream so that the clutch plates become engaged. This rotates the screw propeller and tends to advance the rotating assembly upstream and away from the fixed plate determining the downstream limit of axial movement. The net result is that the assembly seeks a null position slightly upstream from the position at which the clutch is fully engaged and at which clutch plate slippage is sufficient to provide forces driving the assembly upstream that are equal to those of the flowing fluid which tend to carry the assembly downstream. Like the other embodiment, a sensor is used to monitor the rotational movement of the assembly and provide an output signal equatable to a revolution of the assembly and hence the volume flow.

When the principles of the invention are embodied in devices for measuring the volume flow rate conditions of a fluid, buoyancy and gravitational forces acting on the screw member in the direction of its axial movement should be equal and if not they should be equalized by suitable counteracting biasing means. To avoid use of such biasing means it is preferable to measure the volume flow rate condition of the fluid as it flows through a horizontal conduit since under such circumstances gravitation and buoyancy forces acting on the rotating assembly in the direction of its axial movement are zero.

As an adjunct to the discovery, it has also been found that metering devices embodying the principles of the invention may also be used for measuring fluid density conditions. under such circumstances, the rotating assembly is suspended in the fluid media and is biased in the direction of a predetermined position at which the rotor is positively driven. Biasing can be accomplished mechanically or by simply permitting gravitational or buoyancy forces to accomplish this function. Under such circumstances, the velocity obtained by the screw member in seeking a null position of movement bears an inverse relationship to the square root of the sensed density condition.

A general object of the invention is to provide improved metering devices. Another object of the invention is to provide improved volume flow rate metering devices of the type having a linear relationship between the revolutions per unit time of a rotating member and the volume flow condition and wherein the relationship is substantially unaffected by fluid and mechanical friction factors or temperature and viscosity changes of the fluid. Yet another object is to provide improved density measuring devices which are uninfluenced by temperature and viscosity changes of the fluids undergoing measurement. Other objects are to provide simple and inexpensive metering devices which will accomplish the foregoing objectives.

The novel features which are believed to be characteristic of this invention are set forth with particularity in the appended claims. The invention, itself, however, both as to its organization and method of operation, together with further objects and advantages thereof, may best be understood by reference to the following description taken in connection with the accompanying drawings, in which:

Figures 1, 2:
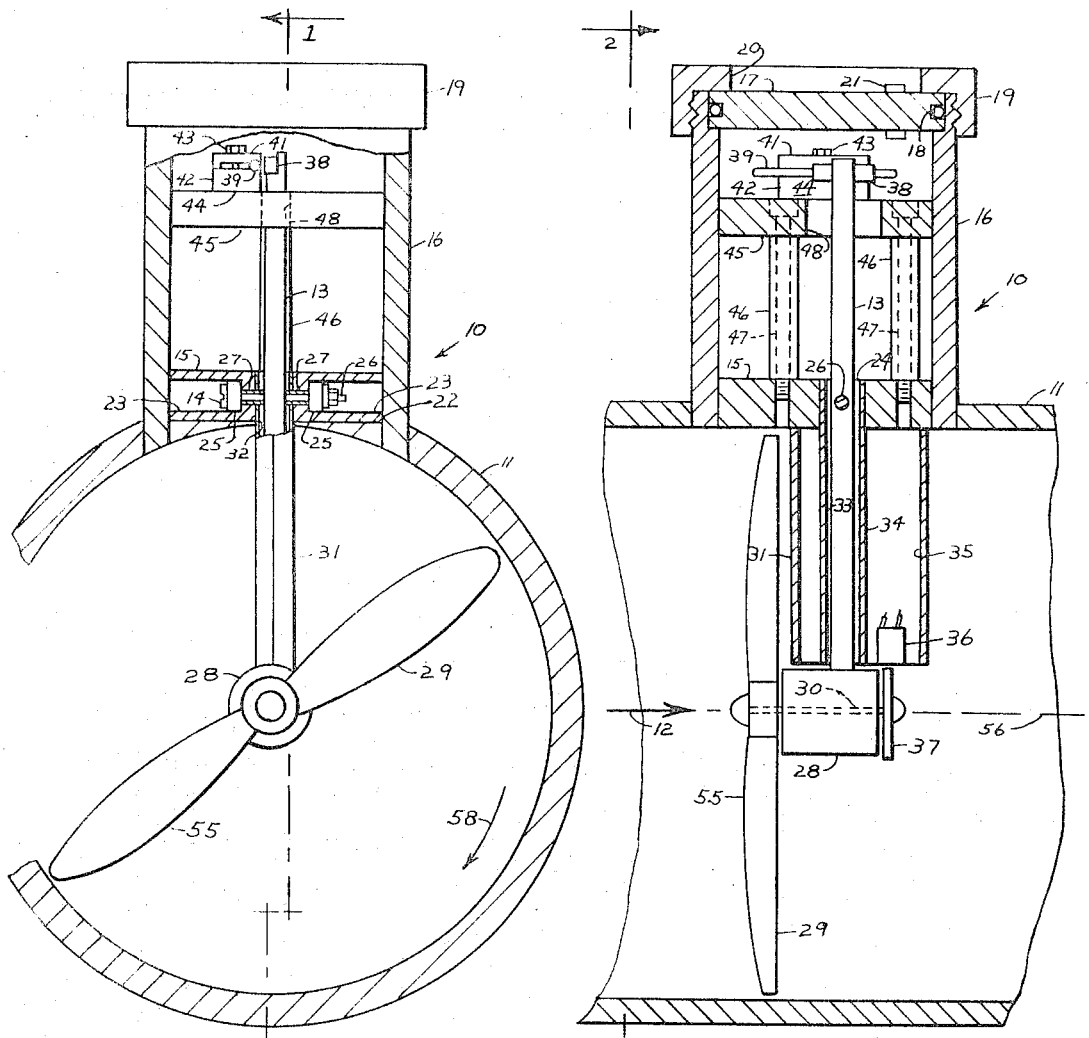
FIG. 1 shows an embodiment of the invention as used for metering the rate of volume flow of a fluid through a conduit, the illustration being shown in vertical section generally along the lines 1—1 of FIG. 2.
FIG. 2 is a front elevational view of the embodiment seen in FIG. 1 as taken along the lines 2—2 of FIG. 1 with certain parts broken away.
Figure 3:
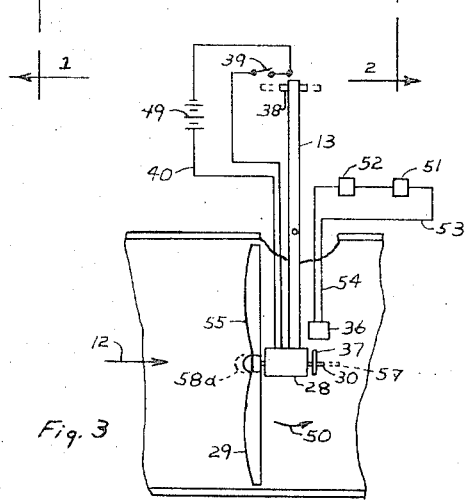
Figure 4:
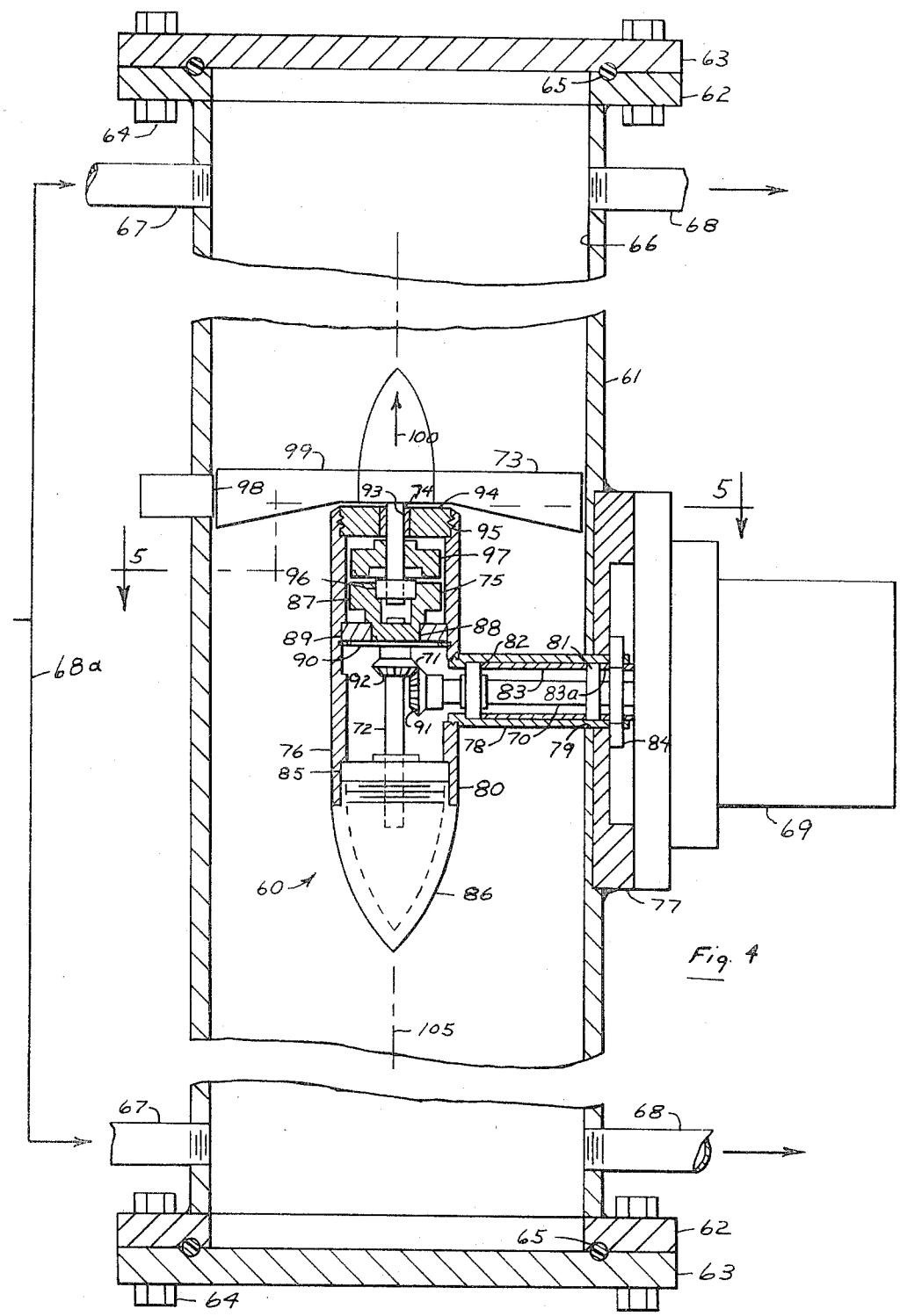
Figure 5:
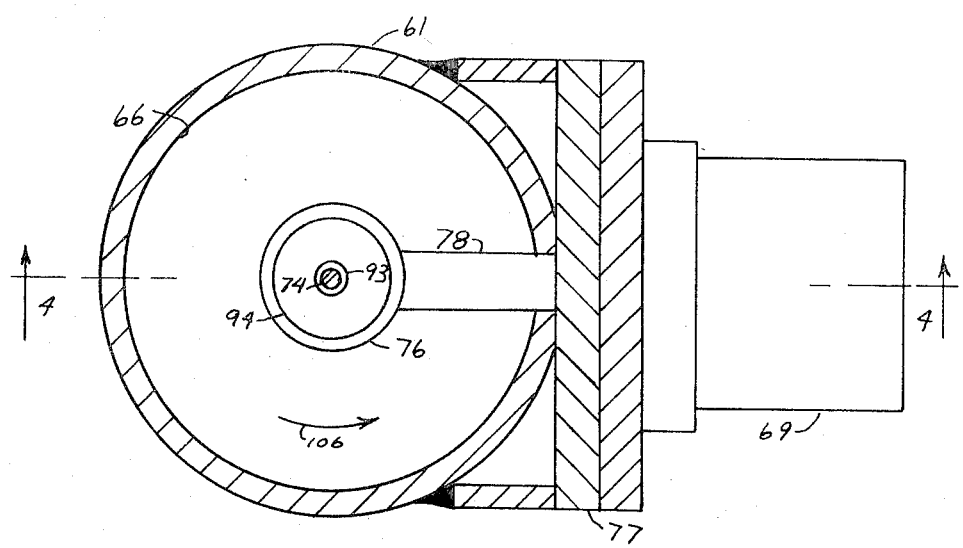
Figure 6:
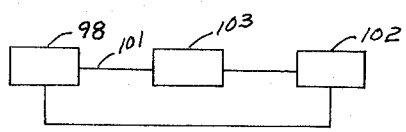
Figure 7:
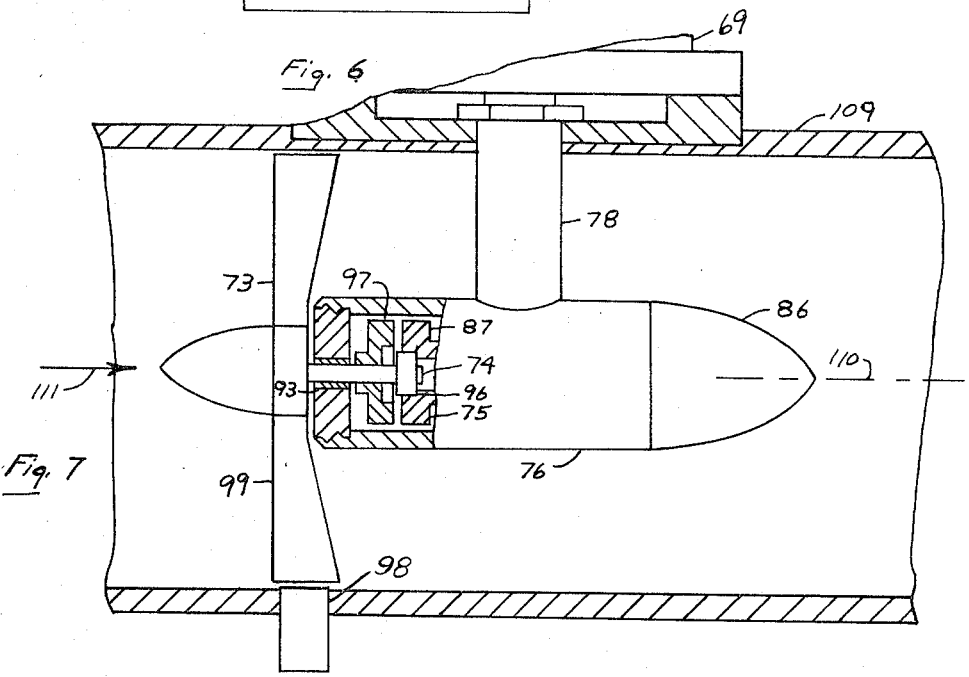
Figure 9:
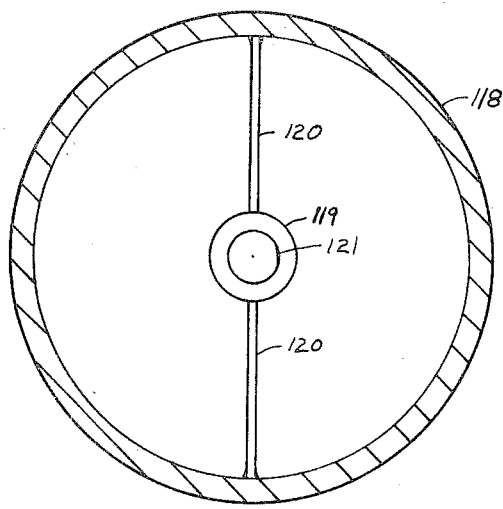
Figure 8:
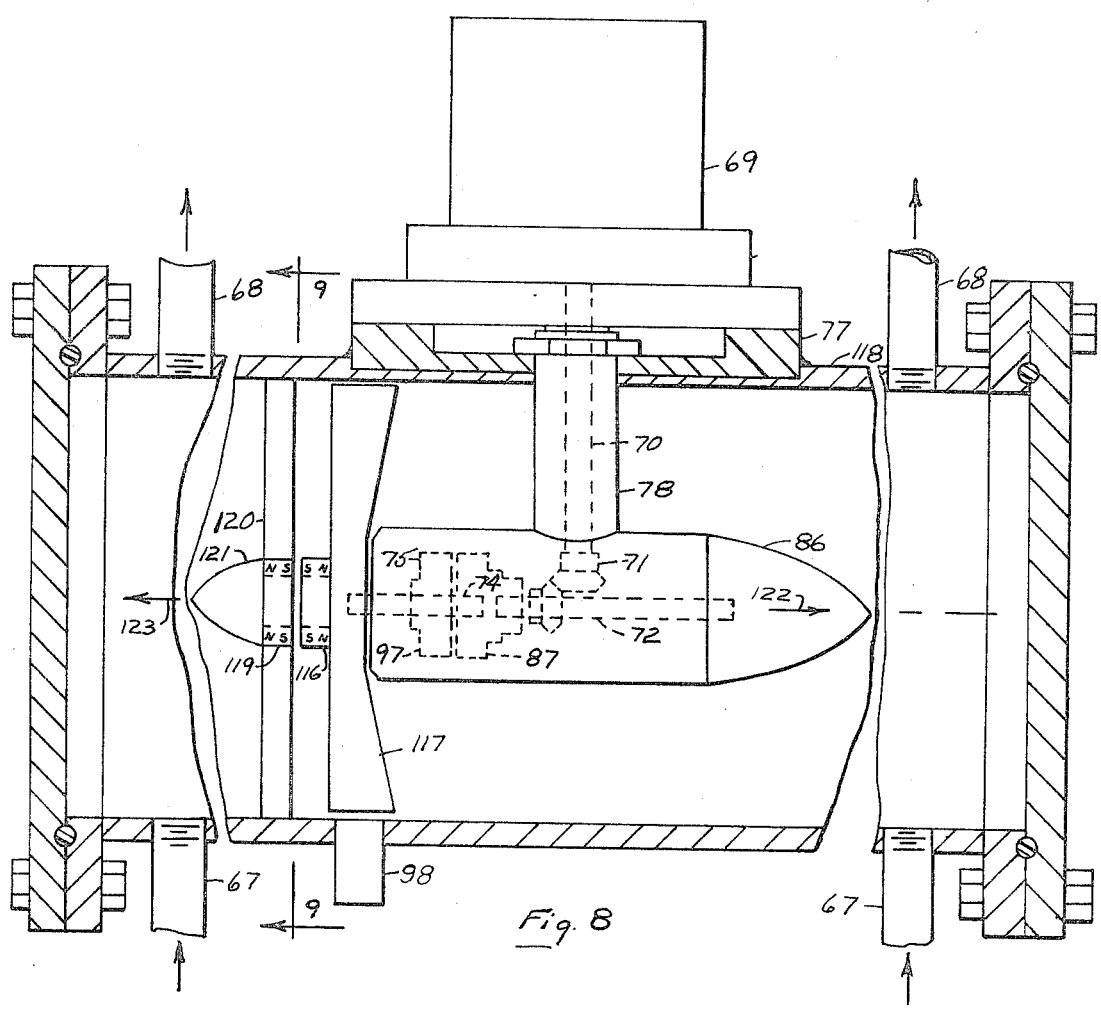

FIG. 3 schematically illustrates the operation of the embodiment shown in FIG. 1 and certain circuitry associated therewith;

FIG. 4 illustrates another embodiment of the invention as used to measure fluid density conditions and is a vertical section taken generally along the lines 4—4 of FIG. 5;

FIG. 5 is a horizontal section through the device shown in FIG. 4 as seen along the lines 5—5 therein;

FIG. 6 schematically illustrates the sensing circuit involved in the embodiment illustrated in FIGS. 4 and 5;

FIG. 7 shows the embodiment of the invention seen in FIGS. 5 and 6 when oriented to measure the flow rate of a fluid;

FIG. 8 shows a modification of the embodiment illustrated in FIGS. 4 through 7 to adapt the device for density measurements when horizontally arranged; and FIG. 9 is a sectional view taken generally along the lines 9—9 of FIG. 8.

DESCRIPTION OF THE EMBODIMENTS

Reference is first made to FIGS. 1 through 3 inclusive and wherein the metering device 10 is illustrated as mounted on a horizontally arranged conduit section 11 for containing the fluid and through which the fluid to be metered is flowing in the direction of arrow 12. Meter 10 includes a pivot arm 13 that is mounted for pivotal movement on a circular support plate 15 by a pivot assembly 14. Support plate 15 is housed within a cylindrical housing 16 that is welded to the upper side of conduit section 11. The upper end of housing 16 is equipped with an internal shoulder that supports a circular plate 17 provided with a circumferentially extending groove in which an O-ring 18 is received to seal the interior of the housing 16 from the exterior of the conduit. Plate 17 is retained in place by a cap 19 that threadingly engages the upper end of the housing and the cap is provided with a circular cutout 20 which facilitates access to an electrical feed through 21 in plate 17 for electrical conductors used in the circuits associated with the device.

Support plate 15 rests on a flat 22 in the wall of conduit 11 and is equipped with opposite recesses 23 for housing components of assembly 14 that are accessible at the periphery of the plate. The pivot arm 13 extends generally vertically through a central opening 24 in plate 15 and the pivot assembly includes a pair of roller bearings 25 that are located in the respective recesses and held in place by a pivot pin 26. Pin 26 is secured to the inner races of the ball bearings 25 and extend through arm 13. Arm 13 is centrally oriented in opening 24 by means of cylindrical spacers 27 that surround the shank of pin 26 at opposite sides of the arm and which are clamped between the arm 13 and the inner races of the ball bearings by means of a nut which threadingly engages the end of pin 26 as seen in FIG. 2.

An electrical motor 28 is mounted at the lower end of arm 13 and the shaft 30 of motor 28 is fixed to a fluid reactive screw propeller 29. The lower end of arm 13 is shielded from the force of the flowing fluid in conduit 11 by means of a narrow streamlined housing 31 that is fixed to plate 15 and extends into the center area of the conduit through a narrow accommodating slot 32 in the wall of section 11. Housing 31 has internal, transversely oriented walls 33 and 34 which at their lower ends limit pivotal movement of arm 13. The housing 31 has a downstream compartment 35 which houses a sensor 36 that is provided to sense the rotational movement of the rotating assembly 55 composed of the screw propeller 29 and shaft 30. Sensor 36 is in the form of an inductance that senses rotational movement of an elongated bar 37 which is fixed to and rotatable with the shaft 13 of the downstream side of motor 28. In the sensing circuit 53 the field of inductance-type sensor 36 is interrupted each time an end of the bar 37 passes in the proximity of the sensor and this produces an output signal 54 that is amplified in amplifier 51 and fed to a counter 52 that operates in a totalizing mode. Each output signal 54 is indicative of a half revolution of the assembly in the illustrated embodiment and is accordingly equatable to a whole revolution and to the volume equivalent thereof.

The upper end of pivot arm 13 extends into a housing 16 and carries a magnet 38 which cooperates with a normally open reed switch component 39 of the energizing circuit 40 for motor 28. Switch 39 is mounted for longitudinal adjustment relative to the magnet 38 by a clamp 44. Clamp 44 includes clamping components 41 and 42 that are held together by a screw element 43 in a clamping action on switch component 39. Clamp 44 is fixed to another circular support plate 45 within housing 16. Plate 45 is vertically spaced from support plate 15 by a pair of cylindrical spacers 46 that surround the shanks of a pair of screw elements 47. Screw elements 47 secure plates 45 and 15 together and threadingly engage the latter as seen in the drawings. Plate 45, as seen in FIG. 1, has an opening 48 which accommodates pivotal movement of arm 13 at the upper end of the assembly.

In the arrangement depicted in FIGS. 1 through 3, the axis of rotation of the assembly 55 comprising the propeller 29 and motor shaft 30 is coincident with the horizontally arranged longitudinal axis 56 of conduit 11 at the null position for the assembly, and within the limits of pivotal movement of the assembly about the pivot axis of pin 26 permitted by walls 33 and 34, the assembly is substantially linearly moveable along the axis 56.

The operation of the metering device 10 is best understood by reference to FIG. 3 and to the exaggerated pivotal movements of the arm depicted therein. Motor 28 is connected in series with switch 39 and a DC electrical power source 49 in the energizing circuit 40 for the motor, and under the influence of fluid flowing in conduit 11 in the direction of arrow 12, the rotating screw assembly 55 is urged in a downstream direction. This causes arm 13 to pivot in the direction of arrow 50 and assembly 55 moves substantially linearly along the axis 56 in the downstream direction. Switch 39 is positioned in clamp 44 to detect the downstream pivotal movement of the assembly 55 from the null position shown in solid lines in FIG. 3 and hence closes circuit 40 and energizes motor 28 to provide an operative drive association between the rotating assembly 55 and the energized motor 28 at a position 57 for the assembly which is slightly downstream from the null position and determined by the location of switch 39. When circuit 40 closes to electrically connect the power source 49 and motor 28, the screw propeller 29 rotates in the direction of arrow 58 and through reaction with the fluid media causes the assembly to advance upstream from position 57. This upstream movement counter to the flow of the fluid through the conduit removes the influences of the magnet from switch 39 and opens the circuit 40 to thus electrically isolate the motor and power source and de-energize the motor. The thrust imparted to the pivotal assembly when the motor is energized is sufficient to advance the assembly slightly upstream from the null position as for example to position 58a and as the circuit becomes inoperative the assembly again comes under the influence of the flowing fluid and is urged in the direction of the predetermined position.

Sensor 36 as previously indicated provides a digital output signal in the sensing circuit which is proportional to the volume flow rate and is totalized in the counter 52 in a manner well known in the art.

In lieu of using the normally open reed switch and constant speed motor one may, of course, use a variable speed motor and provide a circuit in which the speed is progressively increased the further the assembly moves downstream from the null position, as for example by providing a resistance in the circuit energizing the motor and which varies in response to movement of the pivot arm in a manner which will be obvious to those skilled in the art.

Reference is now made to the embodiment shown in FIGS. 4 through 6 and wherein the metering device is generally depicted at 60 and seen as mounted in a conduit section 61 for measuring fluid density conditions. Section 51 has end flanges 62 welded at its opposite ends and is equipped with opposite end plates 63 that are bolted to the end flanges by bolts 64. O-rings 65 are interposed between the flanges 62 and end plates 63 to provide a suitable seal for the fluid container. This arrangement provides a chamber 66 for the fluid and the chamber is provided with a pair of inlet pipes 67 and a pair of outlet pipes 68. Pipes 67 and 68 are sufficiently spaced from the sensing assembly and at opposite sides of the screw member to avoid axial flow of the fluid in the chamber while nevertheless permitting diffusion of the admitted fluid thereof throughout the chamber. The feed pipes 67 are supplied from a common header 68a to avoid pressure differentials resulting in axial flow within the chamber proper and a similar header arrangement (not shown) may be used for the outlet pipes 68.

The metering device includes an exteriorly mounted motor 69 which is drivingly coupled to a drive shaft 70 which, by a gear mechanism 71, is in turn drivingly connected to another shaft 72. The screw propeller 73 is mounted on yet another shaft 74 which is coaxially arranged with shaft 72 and driven thereby through a clutch mechanism designated at 75. Gear and clutch mechanism 71 and 75 are housed in a streamlined housing 76 that is axially arranged in the conduit section 61. Housing 76 is supported from a plate 77 by means of a sleeve 78 which extends through a suitable opening 79 in section 61 and which threadingly engages the cylindrical body portion 80 of housing 76.

Shaft 70 is journaled in a pair of bearings 81 and 82 that are spaced apart by means of an internally located cylindrical sleeve 83. Bearing 82 rests on an internal shoulder at the one end of outer sleeve 78 and the other bearing 81 is clamped between sleeve 83 and another sleeve designated at 83a. The outer sleeve 78 is secured to plate 77 by a nut 84 that threadingly engages the upper end in an accommodating recess in plate 77.

Shaft 72 is journaled in a bearing 85 that engages an internal shoulder at the lower end of the body portion 80 and the bearing is retained in place by a streamlined tail piece 86 which engages internal threads in the proximity of the shoulder area of the body portion. The upper end of shaft 72 is equipped with a clutch plate 87 of mechanism 75 and the hub 88 of the clutch plate is journaled in another bearing 89 that is retained against another internal shoulder of the body portion by a split ring retainer designated at 90. Shaft 70 carries a gear 91 which meshes with another gear 92 fixed to shaft 72 so that rotational movement of shaft 70 is imparted to shaft 72 and thus to the clutch plate component 87 of clutch mechanism 75. Shaft 74 is journaled in a bearing 93 that is mounted in the nut 94 which engages internal threads 95 at the upper end of body portion 80. Shaft 74 is also journaled in a roller bearing 96 having an outside race that is fixed to and rotatable with clutch plate 87. Shaft 74 is axially moveable in the inner race of bearing 96 and the other clutch plate 97 of mechanism 75 is fixed to and rotatable with shaft 74.

The sensor 98 for sensing the rotational movement of the screw element 73 is mounted in the wall of conduit section 61 in this embodiment. The sensor 98 is of the inductance type and as in the other embodiment provides an output signal 101 which is amplified in amplifier 103 and totalized in counter 102.

The rotatable assembly 99 comprising shaft 74, screw propeller 73 and clutch plate 75 is linearly moveable along the longitudinal axis 105 of conduit 61 within the limits determined by the location of clutch plate 87 and bearing 93. In the operation of the densitometer, fluid is continuously passed through the chamber 66 being admitted to the chamber 66 via the inlet pipes 67 and being discharged from the chamber through outlet pipes 68. The rotating assembly 99 in this instance is biased in a downward direction by gravitational forces which exceed the buoyancy forces operating on the assembly and in the normal operation of the metering device motor 69 is run at a constant speed so that via shaft 70, gear mechanism 71 and shaft 72, the plate component 87 of the clutch mechanism 75 is constantly rotated about the vertical axis of shaft 72 at a constant speed and generally in the direction of arrow 106. The gravitational forces exerted upon the rotating assembly 99 tend to bias the assembly into engagement with plate 87 which determines the lowermost position of the assembly 99. When plate 87 is engaged by clutch plate 97, the screw member 73 is rotatably driven and through reaction with the surrounding fluid media tends to advance the assembly 99 upwardly in the direction of arrow 100 from the position determined by the fixed clutch plate 87. This upward linear movement of the assembly 99 causes the assembly to seek a null position and which is slightly above the lower position at which the clutch is fully engaged. The lift on the assembly 99 for reasons of the rotational movement of the screw member balances the gravitational forces biasing the assembly in a downward direction at the null position. Under such circumstances, the revolutions per minute of the assembly is inversely proportional to the square root of the average density condition of the fluid during the measurement period. The sensor 98 senses the rotational movement and provides an output signal 101 which is equatable to a revolution of the assembly and totalized in the counter 102 of the sensing circuit.

Reference is now made to FIG. 7 and wherein the metering device 60 is shown as operating as a volume flow rate meter being mounted on a section 109 of conduit which is arranged with its axis 110 in horizontal alignment with shafts 72 and 74. In this arrangement there are no gravitational or buoyancy force components tending to urge the assembly 99 in either direction along the axis 110 of movement of the assembly 99 and hence linear movement of the assembly along the axis 110 is attributable either to the force of the fluid flowing through the pipe section 109 as in the direction of arrow 111 or to the forces propelling the assembly upstream when the clutch components are engaged.

In operation of the metering device as seen in FIG. 7, the flow of fluid in conduit 109 urges assembly 99 in the direction of arrow 111 until clutch plate 75 engages plate 87. Motor 69, of course, is rotatably driving clutch plate 87 when the meter is in use and when the assembly 99 reaches the downstream position determined by clutch plate 87, the clutch plates 75 and 87 become engaged and assembly 99 is operatively, drivingly connected with the drive mechanism of the meter 60. This rotates the assembly and the reaction of the propeller blades to the flowing media when the assembly is driven is such as to advance the assembly 99 in an upstream direction counter to that shown by arrow 111. This disengages the clutch plates 75 and 87 and renders the assembly inoperatively drivingly connected with the clutch plate 87 so that the assembly 99 then tends to return under the force of the fluid flowing in section 109 to an engaged position. The result, of course, is that the assembly 99 seeks a null position at which the forces acting on the assembly in a downstream direction are equalized by the forces propelling the assembly in an upstream direction. The sensor 98 under such circumstances provides an output signal which is equatable to a revolution of the assembly and which may be totalized to provide a count during a predetermined period which is directly proportional to the volume flow of fluid through the conduit.

Reference is now made to FIGS. 8 and 9 and wherein the meter shown in FIGS. 4 through 7 is seen as modified to permit its use for measuring density conditions when the rotating assembly is arranged to rotate about a horizontal axis. In this instance the nose piece attached to the screw propeller 73 is removed and replaced with a circular disk-type magnet 116 and the rotating assembly 117 includes the magnet 116, the screw member 73, shaft 74 and clutch plate 75. The cylindrical conduit 118 on which the meter is mounted in this instance has another disk-type magnet 119 that is axially mounted in the conduit by means of struts designated at 120. To provide a streamlined arrangement the upstream side of the strut assembly is fixed to and provided with a streamlined nose piece 121.

The magnets 116 and 119 are arranged with the poles such that they repel and this of course urges the assembly 117 under the magnetic forces in the direction of arrow 122 and as such, biases the assembly into the position determined by clutch plate 87. Under such circumstances, the clutch is engaged so that the assembly 117 is rotatably driven and advances in the direction of arrow 123. The rotating assembly 117 accordingly seeks a null position at which clutch plate slippage occurs and at which the propelling forces in the direction of arrow 123 equal the magnetic repulsion forces in the direction of arrow 122. Under such circumstances, the number of revolutions of the propeller sensed by the sensor are inversely proportional to the square root of the average density condition during the time period of the measurement and hence the totalized count can be used to determine the density condition of the fluid media.

While only certain preferred embodiments of this invention have been shown and described by way of illustration, many modifications will occur to those skilled in the art and it is, therefore, desired that it be understood that it is intended herein to cover all such modifications as fall within the true spirit and scope of this invention.

What is claimed as new and what it is desired to secure by letters Patent of the United States is:

1. A fluid metering device comprising a container for the fluid, a rotatable assembly in the container which is substantially linearly moveable within predetermined limits along the general axis of rotation thereof, said assembly having a predetermined position and including a fluid reactive screw member for advancing the assembly in a predetermined direction along the line of movement thereof when the assembly is rotatably driven, drive means for rotatably driving the assembly at its predetermined position, and means for sensing rotational movement of the assembly having an output signal equatable to a revolution thereof, said assembly and drive means having an operative drive arrangement when the assembly is at its predetermined position and an inoperative drive arrangement when the assembly is at positions in advance of said predetermined position.

2. A metering device in accord with claim 1 for measuring the volume flow rate of the fluid where the container comprises a conduit for the flow of the fluid therethrough, where the assembly is substantially linearly moveable along the axis of the conduit and is advanced in an upstream fluid flow direction when the assembly is rotatably driven, and where the drive means includes an electrical power source, an electrical motor drivingly connected to said assembly, and means for electrically connecting the power source and motor to establish said operative drive arrangement and for electrically isolating the power source and motor to establish said inoperative drive arrangement.

3. A metering device in accord with claim 1 for measuring the volume flow rate of the fluid where the container comprises a conduit for the flow of the fluid therethrough, where the assembly is substantially linearly moveable along the axis of the conduit and is advanceable by the screw member in an upstream fluid flow direction when the assembly is rotatably driven, and where the drive means includes rotatable means that is engagable by the assembly to establish said operative drive arrangement and disengagable by the assembly to establish said inoperative drive arrangement.

4. A metering device in accord with claim 1 for measuring the density of the fluid where the assembly is biased in a direction opposite to said predetermined direction.

5. A metering device in accord with claim 4 where the drive means includes rotatable means that is engagable by the assembly to establish said operative drive arrangement and disengageable by the assembly to establish said inoperative drive arrangement.

6. A metering device in accord with claim 1 for measuring the density of the fluid where the assembly is biased in a direction opposite to said predetermined direction by gravitational forces.

7. A metering device in accord with claim 1 for measuring the density of the fluid comprising magnetic means biasing the assembly in a direction opposite to said predetermined direction.

8. A fluid metering device comprising a container for the fluid, a rotatable assembly pivotally moveable about a pivot axis and being substantially linearly moveable in the container within predetermined limits of such pivotal movement, said assembly having a predetermined position and a fluid reactive screw member for advancing the assembly in a predetermined direction along the line of movement when the assembly is rotatably driven, an electric motor drivingly connected to and pivotally moveable with the assembly, an electrical power source, and means for electrically connecting said power source and motor to establish an operative drive arrangement between said motor and said assembly when the assembly is at said predetermined position and for electrically isolating the power source and motor to establish an inoperative drive arrangement between the motor and assembly when the assembly is at positions in advance of said predetermined position, and means for sensing rotational movement of the assembly having an output signal equatable to a revolution thereof.

9. A fluid metering device in accord with claim 8 which comprises an electrical circuit that includes said motor, said power source, and the electrically connecting and isolating means, and where said electrically connecting and isolating means includes switch means that is closed to complete said circuit when the assembly is at said predetermined position, said switch means being responsive to pivotal movement advancing the assembly in the predetermined direction to open said circuit.

10. A fluid metering device for measuring the volume flow rate of the fluid comprising a conduit for the flow of the fluid therethrough, a rotatable assembly pivotally moveable about a pivot axis and being substantially linearly moveable along the axis of the conduit within predetermined limits of such pivotal movements, said assembly having a predetermined position and a fluid reactive screw member for advancing the assembly in an upstream direction from the predetermined position when the assembly is rotatably driven, a motor drivingly connected with the assembly, means for energizing said motor when said assembly is at said predetermined position and for de-energizing said motor when said assembly is at positions in advance of said predetermined position, and means for sensing rotational movement of the assembly having an output signal equatable to a revolution of the assembly.

11. A fluid metering device comprising a container for the fluid, a rotatable assembly substantially linearly moveable within predetermined limits in the container, said assembly having a predetermined position and a fluid reactive screw member for advancing the assembly in a predetermined direction along the line of movement when the assembly is rotatably driven, means for rotatably driving the assembly including a clutch which is engaged at the predetermined position for the assembly and disengaged when the assembly is located in advance thereof, and means for sensing rotational movement of the assembly having an output signal equatable to a revolution of the assembly.

12. A fluid metering device in accord with claim 11 for measuring the density of the fluid where the assembly is biased in a direction opposite to said predetermined direction.

13. A fluid metering device in accord with claim 12 where the assembly is biased by gravitational forces.

14. A fluid metering device in accord with claim 12 comprising magnetic means and where the assembly is biased in the opposite direction by said magnetic means.

15. A fluid metering device for measuring the flow rate of a fluid comprising a conduit for the flow of the fluid therethrough, a rotatable assembly substantially linearly moveable along the axis of the conduit within predetermined limits, said assembly having a predetermined position and a fluid reactive screw member for advancing the assembly in an upstream fluid flow direction when the assembly is rotatably driven, means for rotatably driving the assembly including a clutch which is engaged at the predetermined position for the assembly and disengaged when the assembly is located upstream from said predetermined position and means for sensing rotational movement of the assembly having an output signal equatable to a revolution of the assembly.

* * * * *